(12) United States Patent
Stach

(10) Patent No.: US 12,738,850 B2
(45) Date of Patent: Sep. 15, 2026

(54) METHOD FOR OPERATING A DC-DC CONVERTER FOR SUPPLYING AN ELECTROLYSIS DEVICE WITH ELECTRICAL OPERATING POWER

(71) Applicant: Siemens Energy Global GmbH & Co. KG, Munich (DE)

(72) Inventor: Tilo Stach, Uttenreuth (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 385 days.

(21) Appl. No.: 18/560,431

(22) PCT Filed: Mar. 24, 2022

(86) PCT No.: PCT/EP2022/057767

§ 371 (c)(1),
(2) Date: May 14, 2024

(87) PCT Pub. No.: WO2022/242936

PCT Pub. Date: Nov. 24, 2022

(65) Prior Publication Data

US 2024/0291386 A1 Aug. 29, 2024

(30) Foreign Application Priority Data

May 18, 2021 (EP) .................................... 21174316

(51) Int. Cl.
*H02M 3/158* (2006.01)

(52) U.S. Cl.
CPC ....... *H02M 3/1584* (2013.01); *H02M 3/1586* (2021.05)

(58) Field of Classification Search
CPC ............. H02M 3/1584; H02M 3/1586; H02M 1/0067; H02M 1/0077; H02M 1/008
See application file for complete search history.

(56) References Cited

U.S. PATENT DOCUMENTS

2009/0152949 A1* 6/2009 Adragna ................. H02J 1/102 307/31
2011/0002445 A1* 1/2011 Hattrup ............. H02M 7/53873 378/101

(Continued)

FOREIGN PATENT DOCUMENTS

EP 2863528 A1 4/2015
WO 2013113540 A2 8/2013

(Continued)

OTHER PUBLICATIONS

International Search Report and Written Opinion; Mailed: Aug. 1, 2022; Application No. PCT/EP2022/057767; Filed: Mar. 24, 2022; 12 pages.

(Continued)

*Primary Examiner* — Alex Torres-Rivera
(74) *Attorney, Agent, or Firm* — CANTOR COLBURN LLP; Thomas Roth

(57) ABSTRACT

The invention relates to a method for operating a DC-DC converter for supplying an electrolysis device with electrical operating power, in which in a step at least four controllable semiconductor switching elements in an H-bridge arrangement with interphase transformers connected downstream are controlled by a predetermined control signal sequence for direct conversion of an electrical input DC voltage into an electrical output DC voltage. At least two DC voltage converter units are used, each having four controllable semiconductor switching elements in an H-bridge arrangement with interphase transformers connected downstream, the following steps being carried out: detecting a number of the DC voltage converter units, and adapting the control signal sequence to the detected number of DC voltage converter units.

8 Claims, 4 Drawing Sheets

(56) References Cited

U.S. PATENT DOCUMENTS

| | | | | |
|---|---|---|---|---|
| 2011/0234191 | A1* | 9/2011 | Yeon | H02M 3/33507 323/285 |
| 2016/0349288 | A1* | 12/2016 | Barnette | G01R 19/0092 |
| 2019/0273439 | A1* | 9/2019 | Desai | H02M 3/1584 |
| 2020/0412249 | A1 | 12/2020 | König et al. | |

FOREIGN PATENT DOCUMENTS

| | | | |
|---|---|---|---|
| WO | 2015154918 | A1 | 10/2015 |
| WO | 2016091300 | A1 | 6/2016 |
| WO | 2019043136 | A1 | 3/2019 |
| WO | 2019072634 | A1 | 4/2019 |

OTHER PUBLICATIONS

König et al., "Model Predictive Control of a DC-DC Converter for Battery Emulation," Control Engineering Practice, vol. 21, No. 4, 2013, pp. 428-440.

* cited by examiner

24
ASF
8a
8b
8c
8d
10
12
14a
14b
16a
16b
16c
16d
18a
18b
18c
18d
18e
18f
2f
4f
8f
6

METHOD FOR OPERATING A DC-DC CONVERTER FOR SUPPLYING AN ELECTROLYSIS DEVICE WITH ELECTRICAL OPERATING POWER

BACKGROUND

The invention relates to a method for operating a DC-DC converter for supplying an electrolysis device with electrical operating power.

Hydrogen production by means of electrolysis requires DC currents in excess of several thousand amperes, but a DC voltage in the region of only 100 to 1,400 volts.

To this end, electrolysis devices are supplied with a DC current, by way of operating power, via a connection to a medium-voltage AC grid system. The controlled rectifiers employed for this purpose are line-commutated rectifiers (thyristors) and, by design, must therefore be connected to an AC grid system at all times.

However, there is also a requirement, within smaller separate networks of electrical capacity up to 10 MW, for electrolysis devices to be supplied with electrical operating power in the form of a DC electric current sourced from solar cells or wind energy.

There is consequently a need for the disclosure of means whereby, e.g. for the supply of an electrolysis device with electrical operating power, a direct connection to a low-voltage DC grid system can be achieved.

SUMMARY

The object of the invention is fulfilled by a method for operating a DC-DC controller for supplying an electrolysis device with electrical operating power wherein, in one step, at least four actuatable semiconductor switching elements in an H-bridge arrangement with interphase transformers connected down-circuit are actuated by a predetermined actuation signal sequence for the direct conversion of a DC electric input voltage into a DC electric output voltage, wherein at least two DC voltage converter units are employed, each having four actuatable switching elements in an H-bridge arrangement with interphase transformers connected down-circuit, incorporating the following step: detection of a number of DC voltage converter units and adaptation of the actuation signal sequence to the number of DC voltage converter units detected.

The actuatable semiconductor switching elements can be bipolar transistors which are configured e.g. in the form of IGBTs (insulated-gate bipolar transistors). This means that the actuatable semiconductor switching elements can not only be triggered in the manner of a thyristor, but can also be switched to a blocking state by means of a corresponding actuation signal, independently of a zero-crossing. The DC-DC converter can thus be configured as a self-commutating DC-DC converter. The DC-DC converter is thus configured for direct conversion, i.e. there is no inversion of the electrical input DC voltage into an electrical AC voltage, followed by transformation in the form of a subsequent rectification, e.g. in a DC link.

Corresponding transformation losses can thus be reduced by a direct connection of a low-voltage DC grid system to an electrolysis device.

A DC-DC converter of a modular design is thus employed, which can be adapted to the respective load by the addition or removal of DC voltage converter units. In other words, the DC-DC converter can be configured as a multilevel DC-DC converter of modular design. Beforehand, i.e. prior to commissioning or during an initialization phase in the course of commissioning, the number of DC converter units can be determined independently, e.g. by a control device of the DC-DC converter, and a correspondingly adapted actuation signal sequence can be delivered.

According to a further embodiment, the step for the adaptation of the actuation signal sequence to the detected number of DC voltage converter units includes an adaptation of a pulse frequency of the actuation signal sequence to the detected number of DC voltage converter units.

The adaptation can be a reduction of the pulse frequency. In the event that e.g. two DC voltage converter units are detected, an output pulse frequency for the operation of a single DC voltage converter unit is divided by half. Conversely, in the event that e.g. four DC voltage converter units have been detected, the output pulse frequency is reduced to one quarter. Correspondingly, e.g. in the case of eight DC voltage converter units, the output pulse frequency is reduced to one eighth. In principle, as a result of the greater number of DC voltage converter units connected in parallel, switching losses would be expected to increase. However, this can be counteracted by the reduced pulse frequency, such that energy efficiency at least remains constant, or can even be improved.

According to a further embodiment, the step for the adaptation of the actuation signal sequence to the detected number of DC voltage converter units includes the delivery of an actuation signal sequence for the temporally staggered actuation of actuatable semiconductor switching elements, at least of the DC voltage converter units. This means that, if one actuatable semiconductor switching element of a DC voltage converter unit is in a conducting state, further to actuation, the actuatable semiconductor switching elements of the remaining DC voltage converter units assume an electrically non-conducting state. Thus, e.g. by a doubling of the pulse frequency, associated with the staggered pulsing of DC voltage converter units which are interconnected in the half-bridges, in combination with the two halves of the interphase transformers, which function as voltage dividers, a reduction in the ripple current is further achieved.

The invention further includes a computer program product, which is configured to execute the method, a DC voltage converter for the supply of operating power to an electrolysis device, and a control device for a DC voltage converter of this type. The control device for a DC voltage converter is configured and designed such that, upon the actuation of the DC voltage converter, it determines the actuation signal sequence such that a current of equal strength flows through the first interphase transformer and the second interphase transformer.

BRIEF DESCRIPTION OF THE DRAWINGS

The invention is described hereinafter with reference to a drawing. In the drawing.

DETAILED DESCRIPTION

Figure 1:
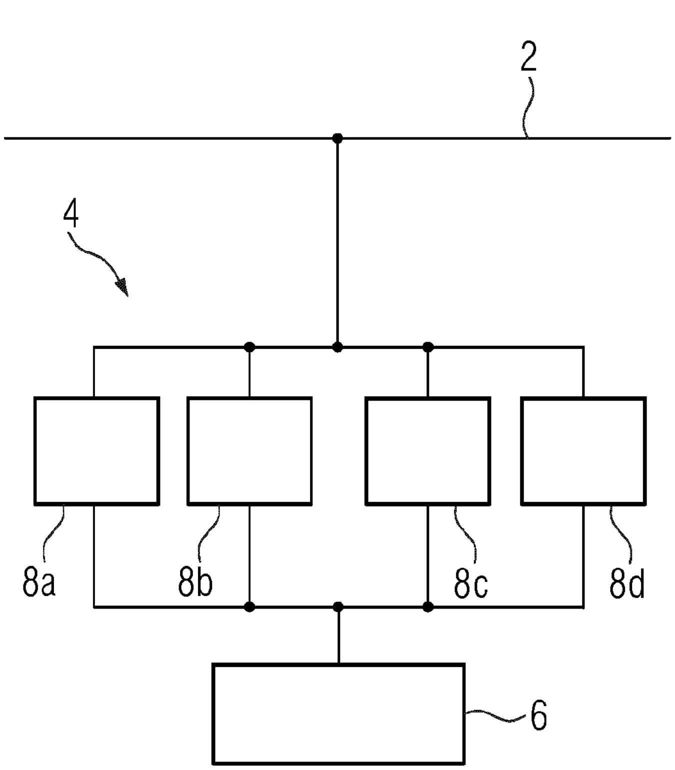
FIG. 1 shows a schematic representation of components of a DC-DC converter.

Reference will firstly be made to FIG. 1.

An electrical grid 2 is represented which, in an exemplary embodiment, is configured in the form of a low-voltage DC grid system.

In an exemplary embodiment, the grid 2 is configured as a small separate network with an electrical capacity of up to 10 MW. In an exemplary embodiment, the DC electric voltage in the electrical grid 2 is 1,500 V.

The grid 2 is supplied with electrical energy generated from solar cells or wind power. By way of a load, an electrolysis device 6 (also described as an electrolyzer) is connected to the grid 2.

The electrolysis device 6 is configured, using electric current supplied by the gird 2, to initiate a chemical reaction, i.e. a material conversion. In an exemplary embodiment, the electrolysis of water is executed, i.e. a breakdown of water into hydrogen and oxygen.

The electrolysis of water requires DC electric currents with current strengths of several thousand amperes, but DC electric voltages within the range of 100 to 1,400 volts only.

To this end, the electric voltage and the electric current strength 2 in grid are converted accordingly. For direct conversion, a DC voltage converter 4 is provided between the grid 2 and the electrolysis device 6.

A DC voltage converter 4 (also described as a DC chopper converter or a DC-DC converter) is understood as an electric circuit which converts a DC electric voltage which is infed at the input thereof into a DC electric voltage with a higher, lower or inverted voltage level.

In an exemplary embodiment, the DC voltage converter 4 is configured as a self-commutating multilevel DC-DC converter of modular design. In an exemplary embodiment, the DC voltage converter 4 includes four DC voltage converter units 8*a*, 8*b*, 8*c*, 8*d*. By way of deviation from an exemplary embodiment, the number n of DC voltage converter units 8*a*, 8*b*, 8*c*, 8*d* can also be different. In particular, it can be provided the DC voltage converter 4 is adaptable to a load, in a modular manner, by the addition or removal of one or more DC voltage converter units 8*a*, 8*b*, 8*c*, 8*d*.

In an exemplary embodiment, the four DC voltage converters 8*a*, 8*b*, 8*c*, 8*d* are of a respectively identical design.

Figure 2:
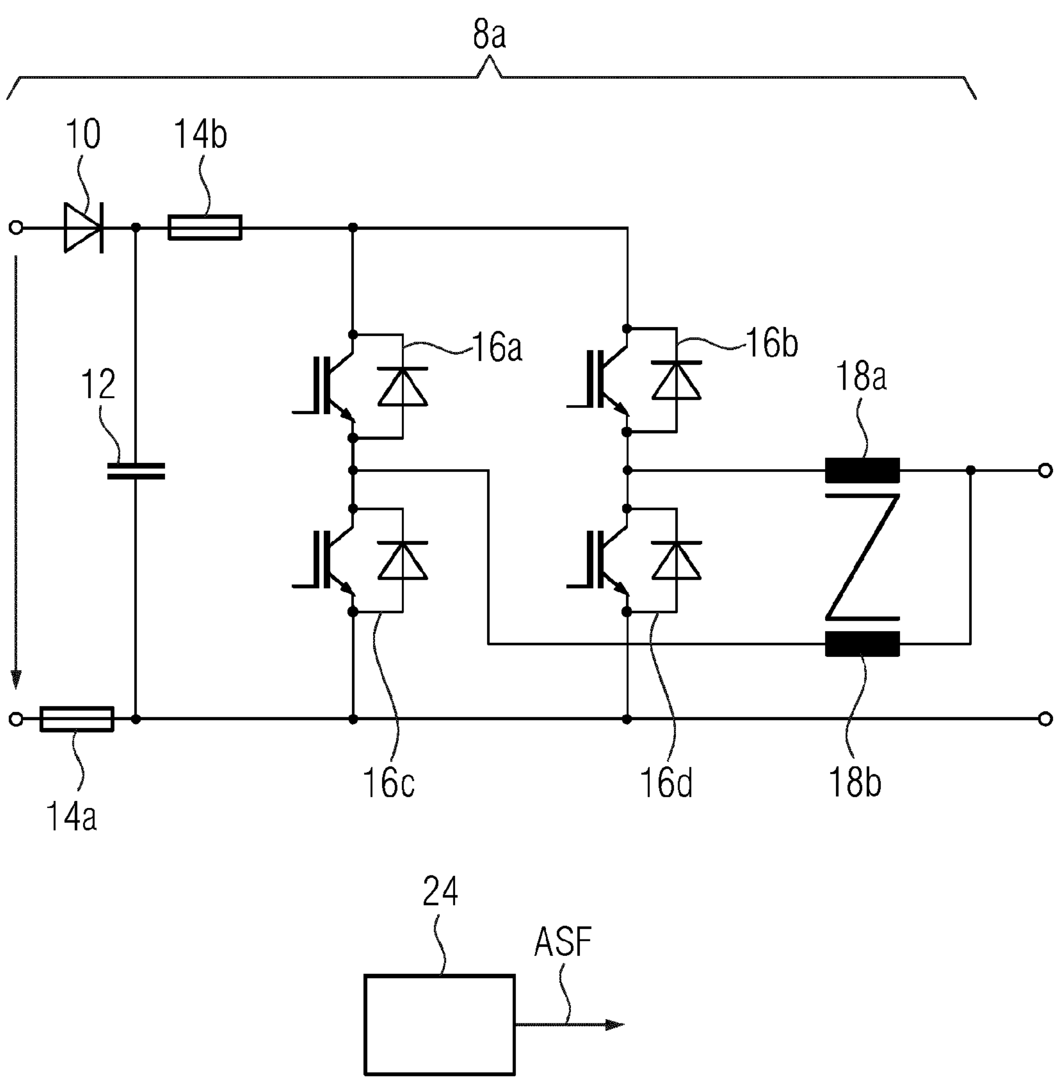
FIG. 2 shows a schematic representation of further details of the DC-DC converter represented in FIG. 1.

The layout of the DC voltage converter unit 8*a* is further described with reference to FIG. 2.

In an exemplary embodiment, the DC voltage converter unit 8*a*, on the input side, includes a diode 10, a capacitor 12, a first fuse 14*a* and a second fuse 14*b*.

In an exemplary embodiment, the DC voltage converter unit 8*a* further includes a first actuatable semiconductor switching element 16*a*, a second actuatable semiconductor switching element 16*b*, a third actuatable semiconductor switching element 16*c*, and a fourth actuatable semiconductor switching element 16*d*.

The first actuatable semiconductor switching element 16*a*, the second actuatable semiconductor switching element 16*b*, the third actuatable semiconductor switching element 16*c* and the fourth actuatable semiconductor switching element 16*d* are arranged, in the manner of a bridge circuit, in an H-bridge, wherein the first actuatable semiconductor switching element 16*a* and the third actuatable semiconductor switching element 16*c* form a first bridge arm, and the second actuatable semiconductor switching element 16*b* and the fourth actuatable semiconductor switching element 16*d* form a second bridge arm of the bridge circuit.

In an exemplary embodiment, the first actuatable semiconductor switching element 16*a*, the second actuatable semiconductor switching element 16*b*, the third actuatable semiconductor switching element 16*c* and the fourth actuatable semiconductor switching element 16*d* each include a bipolar transistor having an insulated-gate electrode. This means that the latter are respectively configured as IGBTs (insulated-gate bipolar transistors), the collector of which defines the input of the switching unit and the emitter of which defines the output of the switching unit. In an exemplary embodiment, one freewheeling diode is respectively assigned to each of the actuatable semiconductor switching elements 16*a*, 16*b*, 16*c*, 16*d*.

On the output side, the DC voltage converter unit 8*a* includes a first interphase transformer 18*a* and a second interphase transformer 18*b*. The first interphase transformer 18*a* and the second interphase transformer 18*b* are magnetically coupled in opposition, i.e. the respective magnetizations of the first interphase transformer 18*a* and the second interphase transformer 18*b* mutually compensate each other. The use of interphase transformers 18*a*, 18*b* advantageously permits a limitation of ripple in an electric current.

A control device 24 of the DC voltage converter 4 is configured, in operation, to deliver an actuation signal sequence ASF for the actuation of the actuatable semiconductor switching elements 16*a*, 16*b*, 16*c*, 16*d*, in order to execute a direct conversion of a DC electric input voltage into a DC electric output voltage. The actuation signal sequence ASF is determined by the control device 24 such that a current of equal current strength flows through the first interphase transformer 18*a* and the second interphase transformer 18*b*.

As electric currents in the respective arms of the interphase transformers 18*a*, 18*b* generate opposing magnetic fields, which cancel each other out, the two interphase transformers 18*a*, 18*b* are configured such that the longitudinal inductance between two DC voltage converter units 8*a*, 8*b*, 8*c*, 8*d* is sufficiently large to provide adequate limitation of any electric crossover current from one DC voltage converter unit 8*a*, 8*b*, 8*c*, 8*d* to another. It is further possible for this electric crossover current to be reduced to a minimum by means of interventions in pulse generation, in order to prevent any saturation of the reactor core. As electric currents in the arms of the respective interphase transformers 18*a*, 18*b* generated opposing magnetic fields, which cancel each other out, the core is thus not magnetized by the load current, or is only magnetized to a limited extent, such that it can be configured with relatively small dimensions.

For this and further operations and/or functions described hereinafter, in particular, the control device 24 can include hardware and/or software components.

Figure 3:
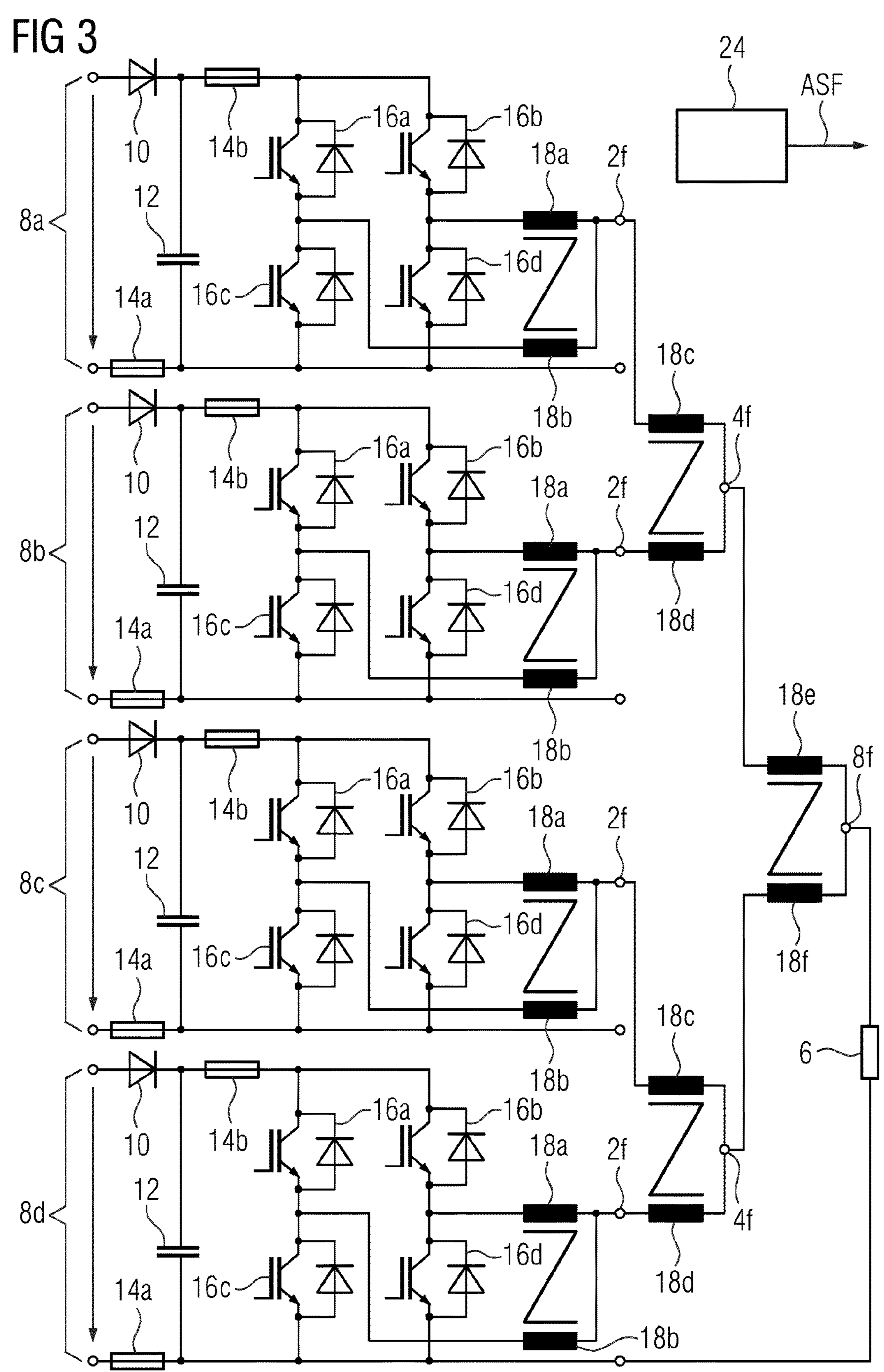
FIG. 3 shows a schematic representation of further details of the DC-DC converter represented in FIG. 1.

Reference will now be additionally made to FIG. 3.

Four DC voltage converter units 8*a*, 8*b*, 8*c*, 8*d* of respectively identical design are represented.

The first DC voltage converter unit 8*a* and the second DC voltage converter unit 8*b*, on the output side, are magnetically coupled by a third interphase transformer 18*c* and a fourth interphase transformer 18*d*. In an analogous manner, the third DC voltage converter unit 8*c* and the fourth DC voltage converter unit 8*d*, on the output side, are magnetically coupled in a first plane.

Moreover, in an exemplary embodiment, the third interphase transformer 18*c* and the fourth interphase transformer 18*d*, on the output side, are respectively magnetically coupled in an analogous manner, in a second plane, by a fifth interphase transformer 18*e*, and by a sixth interphase transformer 18*e* in a third plane.

In an exemplary embodiment, the respective third interphase transformers and 18*c* the fourth interphase transformer 18*d* on the second plane, and the fifth interphase transformer 18*e* and the sixth interphase transformer 18*e* on the third plane are also magnetically coupled in opposition, i.e. the respective magnetizations of the respective interphase transformers 18*c*, 18*d*, 18*e*, 18*f* mutually compensate one another.

In an analogous manner to the preceding exemplary embodiment according to FIG. 1, the control device 24 of the DC voltage converter 4, delivers an actuation signal sequence ASF for the actuation of the actuatable semiconductor switching elements 16*a*, 16*b*, 16*c*, 16*d*, in order to execute a direct conversion of a DC electric input voltage into a DC electric output voltage.

In an exemplary embodiment, the control device 24 is configured beforehand, i.e. prior to the commissioning thereof or during an initialization phase in the course of the commissioning thereof, to determine the number n of DC voltage converter units 8*a*, 8*b*, 8*c*, 8*d*. Moreover, according to an exemplary embodiment, the control device 24 is configured to adapt the actuation signal sequence ASF to the number n of DC voltage converter units 8*a*, 8*b*, 8*c*, 8*d* identified.

In an exemplary embodiment, adaptation of the actuation signal sequence ASF includes an adaptation of a pulse frequency f of the actuation signal sequence ASF to the detected number n of DC voltage converter units 8*a*, 8*b*, 8*c*, 8*d*. In an exemplary embodiment, an output pulse frequency is reduced in accordance with the detected number n of DC voltage converter units 8*a*, 8*b*, 8*c*, 8*d*.

Accordingly, if two DC voltage converter units 8*a*, 8*b* have been detected, in an exemplary embodiment, the output pulse frequency is halved, in order to determine the pulse frequency f. In the event that—as per an exemplary embodiment—four DC voltage converter units 8*a*, 8*b*, 8*c*, 8*d* have been detected, the output pulse frequency is reduced to one quarter, in order to determine the pulse frequency f. Correspondingly, e.g. in the event that the number n is equal to eight, the output pulse frequency is reduced to one eighth, in order to determine the pulse frequency f.

In an exemplary embodiment, in operation, each of the two half-bridges of the DC voltage converter units 8*a*, 8*b*, 8*c*, 8*d* is pulsed with a pulse frequency f of e.g. 2 kHz. At the output of the respective DC voltage converter unit 8*a*, 8*b*, 8*c*, 8*d*, in accordance with the parallel connection via the respective interphase transformers 18*a*, 18*b* on the output side, double the pulse frequency f of one half-bridge, i.e. a frequency of 4 kHz. As a result of the respective interconnection with the respective interphase transformers 18*c*, 18*d*, in an analogous manner, a redoubled frequency of 8 kHz is present on the output side. By means of the further interconnection with the interphase transformers 18*e*, 18*f*, in an analogous manner, a further redoubled frequency of 16 kHz is present on the output side.

In other words, each interface transformer stage, comprising the interphase transformers 18, 18*b* or 18*c*, 18*d* or 18*e*, 18*f*, executes a doubling of the frequency value of the pulse frequency f. In an exemplary embodiment, the output pulse frequency is reduced to one quarter. This reduction of the output pulse frequency reduces switching losses in the DC voltage converter units 8*a*, 8*b*, 8*c*, 8*d*. Switching losses can thus be reduced or compensated by means of additional DC voltage converter units 8*a*, 8*b*, 8*c*, 8*d*.

Moreover, in an exemplary embodiment, the control device 24 is configured to adapt the actuation signal sequence ASF such that the DC voltage converter units 8*a*, 8*b*, 8*c*, 8*d* are actuated in a temporally staggered manner.

In operation, in an exemplary embodiment, each of the two half-bridges of the DC voltage converter units 8*a*, 8*b*, 8*c*, 8*d* is actuated by a pulse which is offset through 180° on the two respective half-bridges of the DC voltage converter units 8*a*, 8*b*, 8*c*, 8*d*.

In an exemplary embodiment, the control device 24 delivers an actuation signal sequence ASF with a dedicated carrier signal for the actuation of the respective half-bridges of the DC voltage converter units 8*a*, 8*b*, 8*c*, 8*d*.

In order to permit each interphase transformer stage, comprising the interphase transformers 18, 18*b*, or 18*c*, 18*d*, or 18*e*, 18*f*, to execute a doubling of the frequency value of the pulse frequency f, in an exemplary embodiment, the first half-bridge comprising the actuatable semiconductor switching elements 16*a*, 16*c* of the first DC voltage converter unit 8*a* is actuated with switching points at 0°, whereas the second half-bridge comprising the actuatable semiconductor switching elements 16*b*, 16*d* of the first DC voltage converter unit 8*a* is actuated with switching points at 180°.

Additionally, in an exemplary embodiment, in an analogous manner, the first half-bridge comprising the actuatable semiconductor switching elements 16*a*, 16*c* of the second DC voltage converter unit 8*b* is actuated with switching points at 90°, whereas the second half-bridge comprising the actuatable semiconductor switching elements 16*b*, 16*d* of the second DC voltage converter unit 8*b* is actuated with switching points at 270°.

Moreover, in an exemplary embodiment, in an analogous manner, first the half-bridge comprising the actuatable semiconductor switching elements 16*a*, 16*c* of the third DC voltage converter unit 8*c* is actuated with switching points at 45°, whereas the second half-bridge comprising the actuatable semiconductor switching elements 16*b*, 16*d* of the third DC voltage converter unit 8*c* is actuated with switching points at 225°.

Finally, in an exemplary embodiment, in an analogous manner, the first half-bridge comprising the actuatable semiconductor switching elements 16*a*, 16*c* of the fourth DC voltage converter unit 8*d* is actuated with switching points at 135°, whereas the second half-bridge comprising the actuatable semiconductor switching elements 16*b*, 16*d* of the fourth DC voltage converter unit 8*d* is actuated with switching points at 315°.

It can also be provided that the pulse frequency f remains the same, independently of the number n of DC voltage converter units 8*a*, 8*b*, 8*c*, 8*d*. This means that only a temporally staggered actuation of the DC voltage converter units 8*a*, 8*b*, 8*c*, 8*d* is executed. Accordingly, energy efficiency can be increased and, additionally, degradation effects associated with ripple currents on the electrolysis device 6 can be evaluated. Any voltage ripple in the output voltage can thus be significantly reduced, e.g. to a residual ripple, which lies within the range of 3% to 5%.

In an exemplary embodiment, each of the DC voltage converter units 8*a*, 8*b*, 8*c*, 8*d* delivers a DC electric output voltage with a current strength of 2,000 A, at a DC electric voltage of 1,350 V. Thus, by means of the four DC voltage converter units 8*a*, 8*b*, 8*c*, 8*d* in an exemplary embodiment, an overall electric current strength of 8,000 A can be delivered. An adaptation to the overall current strength required ca be achieved by the addition or removal of DC voltage converter units 8*a*, 8*b*, 8*c*, 8*d*, wherein the control device 24 independently determines the number n of DC voltage converter units 8*a*, 8*b*, 8*c*, 8*d* and adapts the actuation signal sequence ASF accordingly.

Figure 4:
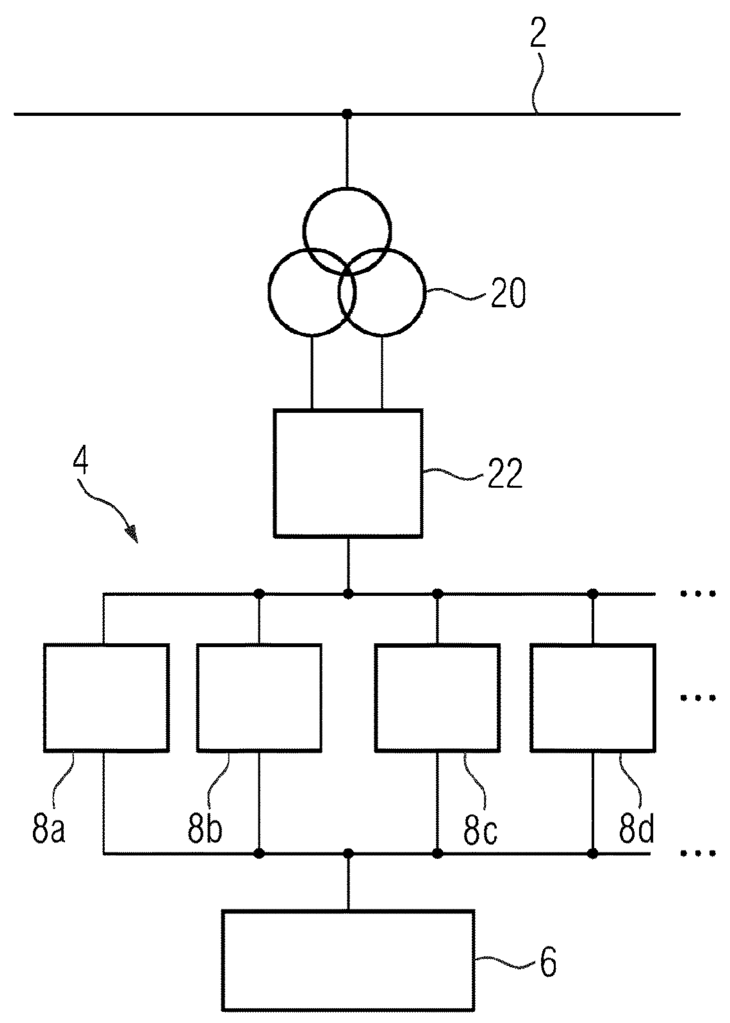
FIG. 4 shows a schematic representation of a combination of the DC-DC converter represented in FIGS. 1 to 3 with a rectifier.

Reference will now be additionally made to FIG. 4.

In an exemplary embodiment, the electrical grid 2 is configured as an AC grid system, e.g. as a three-phase AC grid system.

Consequently, between the grid 2 and the DC voltage converter 4, a transformer 20 which, in an exemplary embodiment, is configured in the form of a three-phase AC transformer and a rectifier 22 are provided.

By the interposition of the transformer 20 and the rectifier 22, the DC voltage converter 4 can thus also be electrically connected to an AC grid system or to a three-phase AC grid system.

Figure 5:
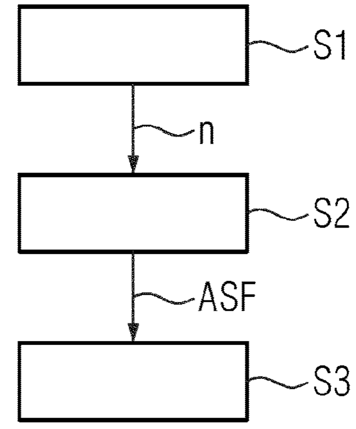
FIG. 5 shows a schematic representation of a process sequence for the operation, in particular of the DC-DC converter represented in FIG. 2.

Reference is additionally made to FIG. 5.

A process sequence is represented for the operation of the system 2 illustrated in FIG. 1.

In a first step S1, the control device 24, e.g. during commissioning or during an initialization phase in the course of commissioning, detects the number n of DC voltage converter units 8*a*, 8*b*, 8*c*, 8*d*.

In a further step S2, the control device 24 adapts the actuation signal sequence ASF to the detected number n of DC voltage converter units 8*a*, 8*b*, 8*c*, 8*d*.

To this end, in an exemplary embodiment, the control device 24 adjusts the pulse frequency of the actuation signal sequence ASF to the detected number n of DC voltage converter units 8*a*, 8*b*, 8*c*, 8*d* and modifies the actuation signal sequence ASF such that the actuatable semiconductor switching elements 16*a*, 16*b*, 16*c*, 16*d* of the at least four DC voltage converter units 8*a*, 8*b*, 8*c*, 8*d* are actuated in a temporally staggered manner.

By means of the actuation signal sequence ASF thus determined, in operation, the actuatable semiconductor switching elements 16*a*, 16*b*, 16*c*, 16*d* of the respective DC voltage converter units 8*a*, 8*b*, 8*c*, 8*d* are then actuated in order to execute the direct conversion of a DC electric input voltage into a DC electric output voltage.

By way of deviation from an exemplary embodiment, the sequence of steps can also be different. Moreover, a plurality of steps can also be executed simultaneously or in combination. Moreover, individual steps can also be omitted or passed over.

Thus, for example, transformation losses can be prevented by a direct connection of a low-voltage DC grid system to an electrolysis device.

The invention claimed is:

1. A method for operating a DC-DC voltage converter for supplying an electrolysis device with electrical operating power wherein, in one step, at least four actuatable semiconductor switching elements in an H-bridge arrangement with interphase transformers connected down-circuit are actuated by a predetermined actuation signal sequence for a direct conversion of a DC electric input voltage into a DC electric output voltage, characterized in that at least two DC voltage converter units are employed, each having four actuatable switching elements in the H-bridge arrangement with the interphase transformers connected down-circuit, incorporating the following steps:

detection of a number of DC voltage converter units, and adaptation of the actuation signal sequence to the number of DC voltage converter units detected, wherein the adaptation of the actuation signal sequence comprises adaptation of a pulse frequency of the actuation signal sequence to the detected number of DC voltage converter units, and wherein the pulse frequency of the actuation signal sequence is reduced according to the detected number of DC voltage converter units.

2. The method as claimed in claim 1, wherein the reduction of the pulse frequency comprises reduction of the pulse frequency in inverse relation to the number of DC voltage converter units detected.

3. The method as claimed in claim 1, wherein the step for the adaptation of the actuation signal sequence to the detected number of DC voltage converter units comprises the delivery of an actuation signal sequence for a temporally staggered actuation of actuatable semiconductor switching elements, at least of the DC voltage converter units.

4. A computer program product, which is configured to execute a method as claimed in claim 1.

5. A DC voltage converter for supplying an electrolysis device with electrical operating power, comprising at least four actuatable semiconductor switching elements in an H-bridge arrangement with interphase transformers connected down-circuit, wherein a control device of the DC voltage converter is configured to deliver a predefined actuation signal sequence to the at least four actuatable semiconductor switching elements for a direct conversion of a DC electric input voltage into a DC electric output voltage, characterized in that the DC voltage converter comprises at least two DC voltage converter units each having four actuatable semiconductor switching elements in the H-bridge arrangement with the interphase transformers connected down-circuit, wherein the control device of the DC voltage converter is configured to identify a number of DC voltage converter units and to adapt the actuation signal sequence to the number of DC voltage converter units identified, wherein the control device of the DC voltage converter is configured to adapt the actuation signal sequence by adapting a pulse frequency of the actuation signal sequence to the number of DC voltage converter units identified, and wherein the control device of the DC voltage converter is configured to adapt the pulse frequency of the actuation signal sequence by reducing the pule frequency according to the number of DC voltage converter units identified.

6. The DC voltage converter as claimed in claim 5, wherein the control device of the DC voltage converter is configured to adapt athe pulse frequency of the actuation signal sequence to the detected number of DC voltage converter units by reducing the pulse frequency in inverse relation to the number of DC voltage converter units identified.

7. The DC voltage converter as claimed in claim 5, wherein the control device of the DC voltage converter is configured to deliver an actuation signal sequence for a temporally staggered actuation of the actuatable semiconductor switching elements of the DC voltage converter units.

8. A control device for a DC voltage converter as claimed in claim 5, which is configured such that, upon the actuation of the DC voltage converter, the actuation signal sequence is determined thereby such that a current of equal current strength flows through a first interphase transformer and a second interphase transformer.

* * * * *